US008560225B2

(12) United States Patent
Frank et al.

(10) Patent No.: US 8,560,225 B2
(45) Date of Patent: Oct. 15, 2013

(54) SYSTEM AND METHOD FOR THE SELECTION OF A UNIQUE GEOGRAPHIC FEATURE

(75) Inventors: Christopher Edward Frank, Orono, ME (US); Markus Wuersch, Orono, ME (US); Daniel P. Martin, Gorham, ME (US)

(73) Assignee: iPointer, Inc., Bakersfield, CA (US)

( * ) Notice: Subject to any disclaimer, the term of this patent is extended or adjusted under 35 U.S.C. 154(b) by 0 days.

(21) Appl. No.: 12/164,916

(22) Filed: Jun. 30, 2008

(65) Prior Publication Data
US 2008/0262723 A1   Oct. 23, 2008

Related U.S. Application Data

(62) Division of application No. 11/224,894, filed on Sep. 12, 2005, now Pat. No. 7,418,341.

(51) Int. Cl.
*G01C 21/30*   (2006.01)

(52) U.S. Cl.
USPC .............. 701/411; 701/23; 701/28; 701/400; 701/409; 701/410; 701/428; 701/455; 701/466; 701/467; 701/468; 701/469; 701/300; 701/301; 701/500; 701/501

(58) Field of Classification Search
USPC ......... 701/206, 207, 208, 210, 212, 213, 211, 701/23, 28, 20, 220–221, 224–225, 701/200–201, 300–301, 400, 409–411, 428, 701/455, 466–469, 500–501; 180/167–169; 455/456.1
See application file for complete search history.

(56) References Cited

U.S. PATENT DOCUMENTS 5,214,757 A * 5/1993 Mauney et al. ............... 715/751
5,470,233 A * 11/1995 Fruchterman et al. ........ 434/112
(Continued)

FOREIGN PATENT DOCUMENTS

WO   WO-2008/005795   1/2008
WO   WO-2009/111578   9/2009
(Continued)

OTHER PUBLICATIONS

M. Egenhofer and J. Herring, "Categorizing Binary Topological Relations Between Regions, Lines and Points in Georgraphic Databases", National Center for Georgraphic Information and Analysis and Department of Surveying Engineering, Department of Computer Science, University of Maine, Orono, Maine.

(Continued)

*Primary Examiner* — Khoi Tran
*Assistant Examiner* — Jorge Peche
(74) *Attorney, Agent, or Firm* — Wilmer Cutler Pickering Hale and Dorr LLP

(57) ABSTRACT

The present invention includes a system and method for selecting a unique geographic feature, including a mobile device that uses position and orientation sensors to determine a user position and a user orientation. The mobile device is adapted for wireless communication with a database that houses or has access to data concerning geographic features, as well as processing and computing means for calculating specific geographic relations discussed in further detail below. The system of the present invention further includes means for selecting among those features that are topologically related to the polygon. These include means for defining the geometry of the polygon, means for filtering those features that should not be within the geometry of the polygon, and means for ranking those features within the polygon. The method of the present invention is operable in conjunction with the system through the system hardware and software.

12 Claims, 7 Drawing Sheets

(56) References Cited

U.S. PATENT DOCUMENTS

| | | | |
|---|---|---|---|
| 5,592,382 A | 1/1997 | Colley | |
| 5,628,050 A * | 5/1997 | McGraw et al. | 455/12.1 |
| 5,633,946 A * | 5/1997 | Lachinski et al. | 382/103 |
| 5,745,113 A | 4/1998 | Jordan et al. | |
| 5,771,169 A * | 6/1998 | Wendte | 702/5 |
| 5,848,373 A * | 12/1998 | DeLorme et al. | 701/455 |
| 6,070,167 A | 5/2000 | Qian et al. | |
| 6,144,318 A | 11/2000 | Hayashi et al. | |
| 6,173,239 B1 | 1/2001 | Ellenby | |
| 6,222,482 B1 * | 4/2001 | Gueziec | 342/357.34 |
| 6,247,019 B1 * | 6/2001 | Davies | 340/989 |
| 6,262,741 B1 * | 7/2001 | Davies | 345/423 |
| 6,282,362 B1 * | 8/2001 | Murphy et al. | 386/224 |
| 6,334,087 B1 * | 12/2001 | Nakano et al. | 701/410 |
| 6,381,540 B1 * | 4/2002 | Beason et al. | 701/468 |
| 6,456,938 B1 * | 9/2002 | Barnard | 701/454 |
| 6,486,831 B1 | 11/2002 | Martorana et al. | |
| 6,504,541 B1 * | 1/2003 | Liu et al. | 345/619 |
| 6,532,304 B1 * | 3/2003 | Liu et al. | 382/203 |
| 6,606,542 B2 * | 8/2003 | Hauwiller et al. | 700/283 |
| 6,708,109 B1 * | 3/2004 | Pradhan et al. | 701/521 |
| 6,732,120 B1 * | 5/2004 | Du | 715/764 |
| 6,795,768 B2 * | 9/2004 | Bragansa et al. | 701/516 |
| 6,799,115 B1 * | 9/2004 | Childs et al. | 701/532 |
| 6,847,883 B1 * | 1/2005 | Walmsley et al. | 701/400 |
| 6,879,838 B2 | 4/2005 | Rankin et al. | |
| 6,912,545 B1 | 6/2005 | Lundy et al. | |
| 6,930,715 B1 | 8/2005 | Mower | |
| 6,965,828 B2 * | 11/2005 | Pollard | 701/408 |
| 6,982,697 B2 | 1/2006 | Wilson et al. | |
| 6,983,202 B2 * | 1/2006 | Sanqunetti | 701/468 |
| 7,031,875 B2 | 4/2006 | Ellenby et al. | |
| 7,174,301 B2 * | 2/2007 | Florance et al. | 705/313 |
| 7,245,923 B2 * | 7/2007 | Frank et al. | 455/456.1 |
| 7,295,922 B2 * | 11/2007 | Simon Robert et al. | 701/409 |
| 7,418,341 B2 | 8/2008 | Wuersch et al. | |
| 2001/0044309 A1 | 11/2001 | Bar et al. | |
| 2002/0140745 A1 * | 10/2002 | Ellenby et al. | 345/848 |
| 2002/0155844 A1 | 10/2002 | Rankin et al. | |
| 2002/0165662 A1 | 11/2002 | Maruyama et al. | |
| 2003/0083063 A1 | 5/2003 | Wang et al. | |
| 2003/0149557 A1 | 8/2003 | Cox et al. | |
| 2004/0002303 A1 | 1/2004 | Hirokawa | |
| 2004/0021780 A1 | 2/2004 | Kogan | |
| 2004/0024522 A1 * | 2/2004 | Walker et al. | 701/210 |
| 2004/0078278 A1 | 4/2004 | Dauga et al. | |
| 2004/0087294 A1 | 5/2004 | Wang | |
| 2004/0145591 A1 | 7/2004 | Luo et al. | |
| 2005/0108646 A1 | 5/2005 | Willins et al. | |
| 2005/0125145 A1 * | 6/2005 | Sakashita et al. | 701/208 |
| 2005/0130671 A1 * | 6/2005 | Frank et al. | 455/456.1 |
| 2005/0165548 A1 * | 7/2005 | Persson | 701/211 |
| 2005/0288858 A1 * | 12/2005 | Amer et al. | 701/211 |
| 2006/0041375 A1 * | 2/2006 | Witmer et al. | 701/208 |
| 2006/0103590 A1 | 5/2006 | Divon | |
| 2006/0208927 A1 | 9/2006 | Poor et al. | |
| 2006/0270460 A1 | 11/2006 | Konkka et al. | |
| 2006/0294062 A1 * | 12/2006 | Folchetti et al. | 707/3 |
| 2007/0049313 A1 | 3/2007 | Grams et al. | |
| 2007/0050129 A1 * | 3/2007 | Salmre | 701/207 |
| 2007/0055441 A1 | 3/2007 | Retterath et al. | |
| 2007/0150179 A1 * | 6/2007 | Pinkus et al. | 701/208 |
| 2007/0288196 A1 | 12/2007 | Frank et al. | |
| 2008/0049016 A1 | 2/2008 | Shearer | |
| 2008/0070684 A1 | 3/2008 | Haigh-Hutchinson | |
| 2008/0109758 A1 | 5/2008 | Stambaugh | |
| 2008/0114564 A1 | 5/2008 | Ihara | |
| 2008/0133488 A1 | 6/2008 | Bandaru et al. | |
| 2008/0162032 A1 | 7/2008 | Wuersch et al. | |
| 2009/0227269 A1 | 9/2009 | Frank et al. | |
| 2010/0303293 A1 | 12/2010 | Caduff | |
| 2010/0303339 A1 | 12/2010 | Caduff | |
| 2010/0306200 A1 | 12/2010 | Frank et al. | |
| 2010/0306707 A1 | 12/2010 | Caduff | |

FOREIGN PATENT DOCUMENTS

| | | |
|---|---|---|
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

Egenhofer, M. J. et al., "A Mathematical Framework for the Definition of Topological Relationships", *Proceedings of the 4th International Symposium on Spatial Data Handling*, Zurich, Switzerland, Jul. 23-27, 1990, pp. 803-813.

Egenhofer, M.J. et al., "Beyond Desktop GIS a Family of Portable Spatial Information Technologies", *In GIS PlaNET*, Lisbon, Portugal, 1998, 4 pages.

International Search Report and Written Opinion of the International Searching Authority, the United States Patent and Trademark Office, for International Application No. PCT/US2009/069860, dated Mar. 2, 2010, 7 pages.

International Search Report and Written Opinion of the International Searching Authority, the European Patent Office, for International Application No. PCT/US2007/072358, dated Nov. 30, 2007, 8 pages.

International Search Report and Written Opinion of the International Searching Authority, the United States Patent and Trademark Office, for International Application No. PCT/US2009/069312, dated Mar. 4, 2010, 8 pages.

International Search Report and Written Opinion of the International Searching Authority, the United States Patent and Trademark Office, for International Application No. PCT/US2009/069313, dated Feb. 19, 2010, 8 pages.

International Search Report and Written Opinion of the International Searching Authority, the United States Patent and Trademark Office, for International Application No. PCT/US2009/069327, dated Mar. 4, 2010, 7 pages.

International Search Report and Written Opinion of the International Searching Authority, the United States Patent and Trademark Office for International Patent Application No. PCT/US2009/036053, dated Apr. 22, 2009, 5 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

* cited by examiner

SYSTEM AND METHOD FOR THE SELECTION OF A UNIQUE GEOGRAPHIC FEATURE

BACKGROUND OF THE PRESENT INVENTION

1. Field of the Invention

The present invention relates generally to systems and devices for determining geographic information, and specifically to distributed systems and devices for interpreting spatial and geographic data and presenting said data to a user.

2. History of the Related Art

Maps still provide the main means for understanding spatial environments, as well as for performing tasks such as way finding, trip planning, and location-tracking. Static traditional maps have several disadvantages. First, maps necessarily have a fixed orientation. That is, the map always faces in one direction (typically north). The map users, however, may be facing any direction at any given moment. Hence, in order to understand the map users need to perform some kind of rotation, either of them and/or of the map to align their frame of reference with the map's frame of reference or to align the map's frame of reference with the real world's frame of reference. This process puts an immense cognitive load on the users, because it is not always intuitive and may present considerable difficulties, especially in cases of complex, uniform or unfamiliar spatial environments.

Maps are also hindered by the fact that they have a fixed scale that cannot be changed to a different granularity level. This limitation is one of the most restrictive aspects of paper maps. The scale determines the level of zooming into a spatial environment, as well as the level of detail and the type of information that is displayed on a map. Users, however, need to constantly change between different scales, depending on whether they want a detailed view of their immediate surrounding environment or a more extensive and abstract view in order to plan a trip or find a destination. Current solutions to the problem include tourist guides that comprise maps of a specific area at many different scales. Tourist guides, however, are bulky books, difficult to carry around, and search time is considerable as they typically consist of hundreds of pages.

Maps also fail to accommodate rapid changes in our natural and urban environments. On a map, all spatial environments and the objects that they encompass, whether artificial or natural, are displayed statically although they are actually dynamic and change over time. Artificial spatial objects, such as buildings, may get created, destroyed, or extended, while others, such as land parcels, may merge, shrink, or change character (e.g., when a rural area is developed). The same holds true for natural features, for instance, a river may expand or shrink because of a flood. The static 2-dimensional map is restricted to representing a snapshot in time and the information on it may soon become obsolete, or worse, misleading.

Maps are also limited in their ability to display thematic information. There are many different types of maps such as morphological, political, technical, tourist-oriented, and contour maps. The thematic content of a static map must be defined at the time of printing and is usually restricted to one area of interest. Even then, the information displayed is minimal. For example, a tourist map will indicate that a building is a church or a restaurant, but it is highly unlikely that more information will be available, such as the construction date of the church or the menu of the restaurant and the type of cuisine it offers.

Attempts at electronic maps or geographic information systems have also proven unworkable for practical reasons. One deficiency found in current geographic information systems is that the systems are not egocentric, i.e. they cannot discriminate between data based upon the user's point of view and intentions. The state of the art provides an integrated geographic information system that can provide information to a user in a manner that is easily accessible, intuitively understood, and based upon the user's perspective.

Unfortunately, any such attempt to provide a user with information regarding his or her environment must then also be able to discriminate amongst the relevant data to provide the minimum necessary data required by the user. While modern geographical information systems have become adept at providing large amounts of information to users, there is still a need in the art for a system and method that can select only those features intended by the user while eliminating the remaining data and noise.

SUMMARY OF THE PRESENT INVENTION

Accordingly, the present invention includes a system and method for selecting a unique geographic feature. The system of the present invention includes a mobile device that uses position and orientation sensors to determine a user position and a user orientation. The mobile device is adapted for wireless communication with a database that houses or has access to data concerning geographic features, as well as processing and computing means for calculating specific geographic relations discussed in further detail below.

In use, the mobile device communicates with the database, and through such communication the position and orientation of a user are defined mathematically as a polygon extending from the user into space. Knowing the dimensions and directions of the polygon, the database can determine if and to what extent any geographical features share a geographic relationship with the polygon. To the extent that geographic features share these topological relations with the polygon, the database communicates to the user that these select features are what he or she is looking at.

The system of the present invention further includes means for selecting among those features that are topologically related to the polygon. These include means for defining the geometry of the polygon, means for filtering those features that should not be within the geometry of the polygon, and means for ranking those features within the polygon. Each of these selection means is employed along or in cooperation with one another for aiding the user in selecting a unique geographic feature from all the likely candidates.

The present invention further includes a method for selecting a unique geometric feature that includes methods for defining the geometry of a polygon, methods for filtering geographic features that are within the polygon, and methods for ranking those features that remain within the polygon. In particular, the method of the present invention includes ranking means that utilize the user position and the user orientation to determine which of the geographic features within the polygon is the one most likely sought by the user. Unlike standard a posteriori calculations regarding probability, the method of the present invention uses real data from the user position and user orientation to calculate an a priori probability as to which of the geographic features is seeking.

The method of the present invention is described further herein as a series of steps that are adapted for use with the system of the present invention. In particular, it is anticipated that the method of the present invention can be practiced by software that is operable on the system's database and in

DETAILED DESCRIPTION OF THE PREFERRED EMBODIMENTS

The present invention includes a system and a method for the selection of a geographic feature. In particular, the system and method of the present invention are readily adapted for so-called mobile geographic information systems (GIS), which are known in the art as hand held devices for aiding users in locating and retrieving information about a particular geographic feature. As noted above, the current state of the art in these systems lacks the necessary means for the selection of unique geographic features. In order to remedy these and other issues, the present invention employs a number of strategies in order to select a unique geographic feature, including filters, geometric constraints and a ranking system including means for assessing the probability that the user intended to select a particular geographic feature.

Figure 1:
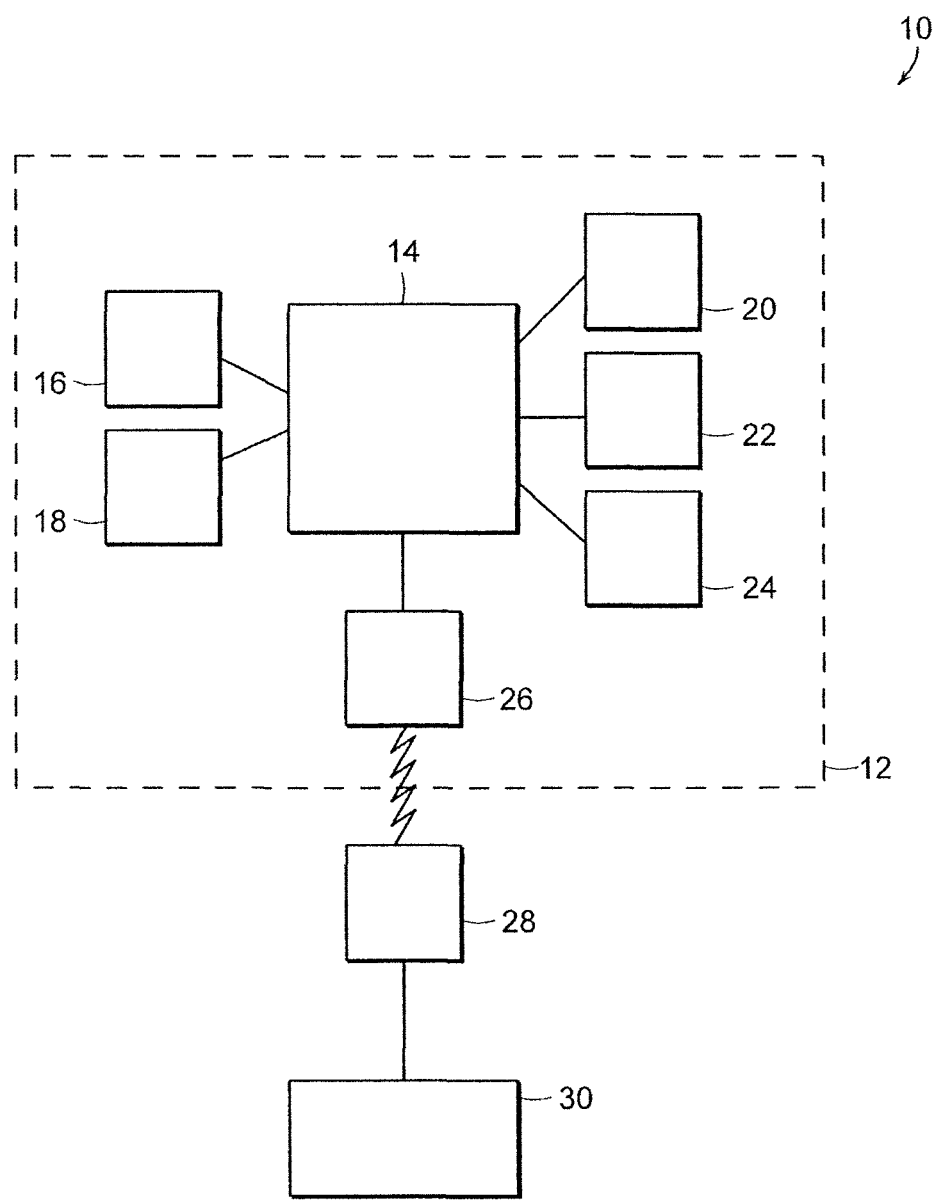
FIG. 1 is a schematic representation of the system for selecting a unique geographic feature in accordance with the present invention.

Referring now to FIG. 1, a system 10 for providing geographic information is shown in schematic format. As described more fully below, the system 10 of the present invention is an improvement over existing GIS system and associated methods. In particular, the system 10 provides a user with a more intuitive and egocentric model of his or her physical surroundings while also providing the means for ensuring that the user can select an intended geographic feature.

The system 10 generally includes a mobile device 12, designated by the phantom line that encompasses a number of elements, a wireless router 28 and a database 30 disposed remotely from the mobile device 12. The mobile device 12 may be any portable electronic or computing device, such as a personal digital assistant, wireless telephone, laptop personal computer, tablet personal computer or any other electronic apparatus that is capable of carrying out digital instructions based on data that is supplied from a remote location. The wireless router 28 is connectable to the mobile device 12 through a wireless network connection. The wireless router 28 is further connected to a database 30 that organizes and stores geographic, historical, and other data about any number of landmarks, buildings, and locations. The database 30 includes means, such as software applications, for carrying out numerous instructions and calculations at the behest of the mobile device 12 and its user.

The mobile device 12 includes a number of subsystems and sensors that are adapted for determining a wide array of geospatial information. The mobile device 12 includes an antenna 26 that is capable of communicating wirelessly with the wireless transceiver 28, as indicated above. The mobile device 12 also includes a controller 14 that is coupled to the antenna 26. The controller 14 is adapted to receive signals from the antenna 26, transmit signals through the antenna 26, as well as receive and process data from a plurality of sensors as discussed below.

The mobile device 12 includes a position sensor 20, such as a Global Positioning System (GPS) that is capable of determining a position by such variables as latitude, longitude and altitude. The position determined by the position sensor 20 is hereinafter referred to as the user location or first location. An orientation sensor 22 and a pitch sensor 24 are also included in the mobile device 12 for determining a set of angles that correspond to a user orientation or first direction.

The mobile device 12 also includes a display 16 and an audio output 18 that relay any information retrieved from the database 30 to the user. The audio output 18 is preferably connected to a set of headphones, and in a most preferred embodiment, the audio signals may be sent wirelessly to the user's headphones through the antenna 26. In alternate embodiments, the display 16 and audio output 18 may be disposed in a separate electronic device, such as a portable digital assistant, which is remotely located from the mobile device 12 itself. In such an embodiment, the mobile device 12 would consist primarily of the sensory components and the communications components outlined above.

Figure 2:
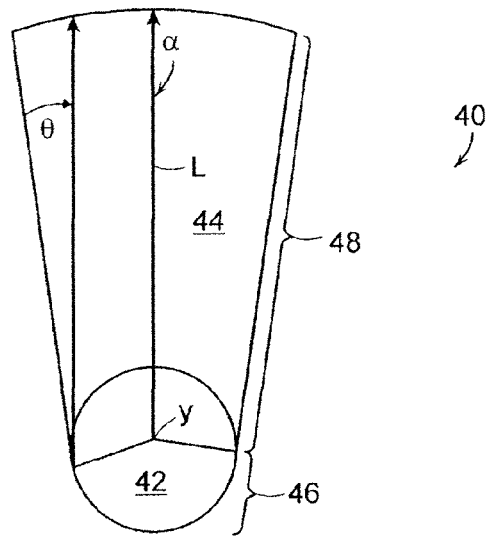
FIG. 2 is a schematic representation of a polygon defined by a user implementing the system and method of the present invention.

In operation a user selects geographic features of interest in his or her environment using the mobile device 12. The means for doing so relies heavily on the intersection of geometry and known data, including the location of myriad geographic features. In use, the mobile device 12 is represented by a geometric polygon 40, shown schematically in FIG. 2. For a user located at a position in space y oriented in direction α, one can define the polygon 40 about the position y including a GPS error portion 42 and an orientation error portion 44 attributable to an orientation error defined by angle θ. The resulting polygon 40 can be further divided into a forward portion 48 and a rearward portion 46. The forward portion 48 should be understood as a geometric space containing geometric features to which a user always could point the mobile device 12. The rearward portion 46 should be understood as that portion of the polygon 40 that is not the forward portion 48, i.e. the space behind the user to which in some situations the user cannot point the mobile device 12. Lastly, the polygon 40 of the present invention includes a length L, which is used to determine the overall area of the polygon 40. The value of L is variable and depends heavily on additional features of the present invention described below.

Figure 3:
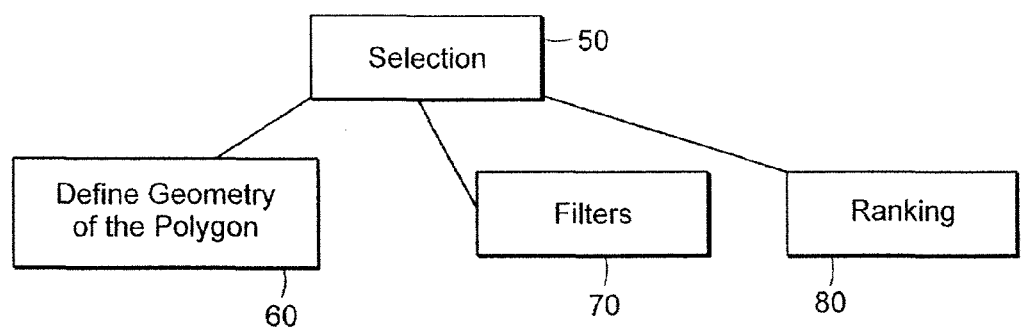
FIG. 3 is a block diagram of the selection means of the system and method of the present invention.

In its preferred embodiments, a set of selection means 50 of the present invention are embodied in computer software that is operated on the database 30. The selection means 50 are depicted in the flow chart of FIG. 3. In particular, the database 30 and the mobile device 12 are in wireless communication such that the database 30 receives data concerning the position y, and the orientation α of the mobile device 12. Having data concerning a predetermined set of geographical features stored therein, the database 30 can calculate the necessary coincidence between the polygon 40 and any of the set of geographical features using methods described in the art. Moreover, the database 30 is adapted to employ the selection means 50 of the present invention to further aid the user in selecting a unique geographic feature from those coextensive with the polygon 40.

To that end, selection means 50 include means for defining the geometry of the polygon 40, a plurality of filters 70 for selecting or removing features of interest, and means for ranking 80 selected features in response to the device use. Along or in combination, the noted selection means 50 of the present invention enable a user to more precisely and definitively select a geographic feature of interest.

Figure 4:
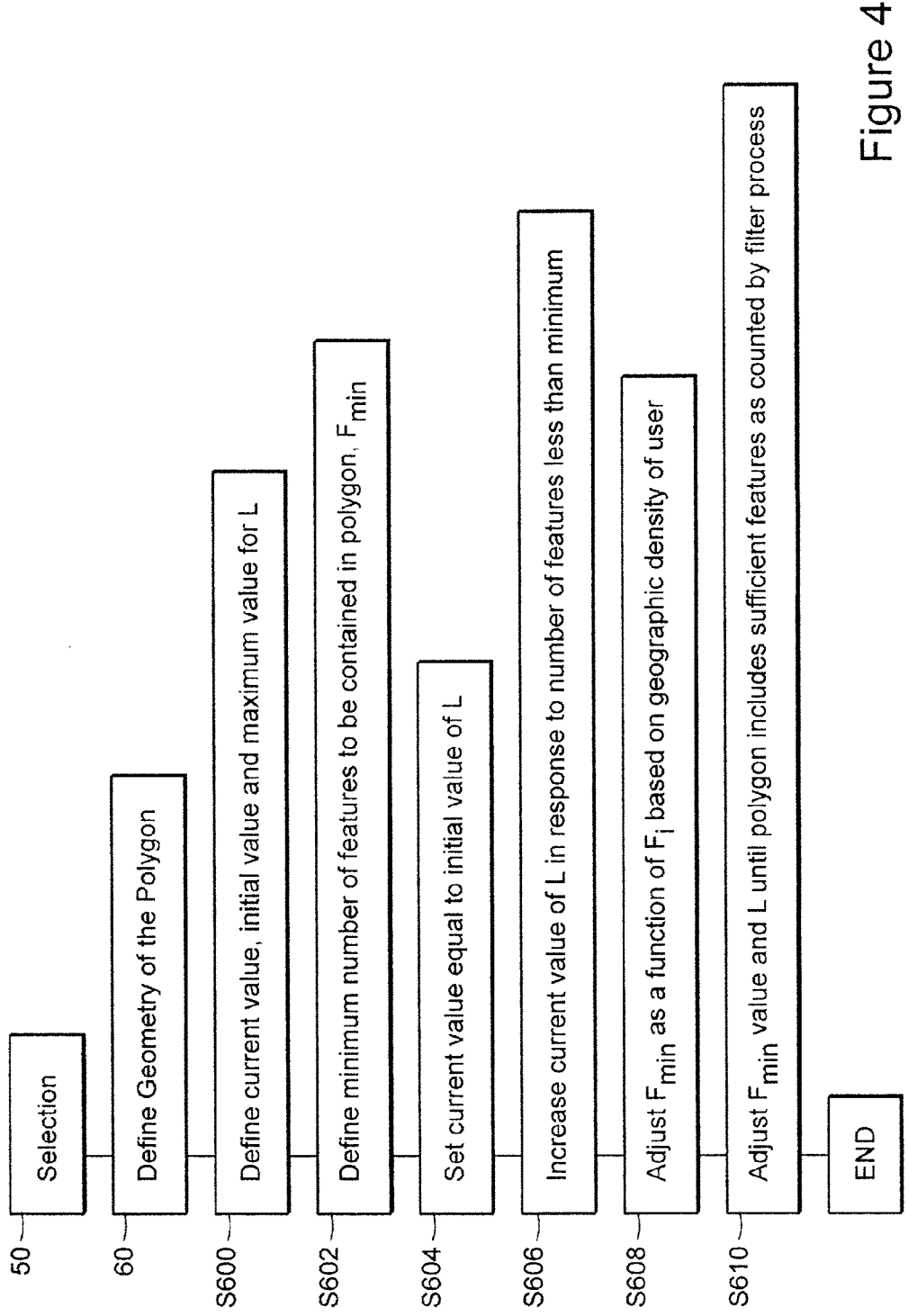
FIG. 4 is a flow chart depicting a method for defining a geometry of a polygon in accordance with the present invention.

FIG. 4 is a flow chart depicting a method for defining the geometry of a polygon in accordance with the present invention. Following the initial step of initiating the selection means 50, the method of the present invention then enters a subroutine for defining the geometry of the polygon 60. In step S600, the method defines current, initial and maximum values for the length L, of the polygon 40. In preferred embodiments, the initial and maximum L values are predetermined and may be dependent upon the location y determined by the mobile device 12. Preferably, the current L value is set to equal the initial L value, from which the current value of L can vary accordingly.

In operation, as the user makes a selection using the mobile device 12, the database 30 will select a number of geographical features based in part upon the length L of the polygon 40. If an insufficient number of features are selected, then another selection is made and the value of L is increased incrementally so as to include additional features. Thus the end or optimal value of L is dependent at least upon the number of features, F, included within the polygon 40.

In step S602, the method defines a minimum number of features, $F_{min}$, which must be contained within or otherwise coincide with the polygon 40. The value of $F_{min}$ is defined in part by an initial value, $F_i$, that is predetermined and partially influenced by the number of features in the user's surrounding. For example, in a dense urban neighborhood, the value of $F_i$ would be higher than in a remote wilderness location in order to ensure a plentitude of features from which to select. The value of $F_{min}$ in turn is a function of $F_i$, such as for example: $F_{min}=F_i+x$, where x is initially set to a value of 1.

Accordingly, the value of L will steadily increase as the database 30 determines whether there are a sufficient number of features within the polygon 40. Once the value of L is determined by the database 30, the results of the selection are communicated to the mobile device 12 and the user.

In step S604, the current value of L is set equal to the initial L value, based again in part on the $F_i$ and $F_{min}$ values described above. In step S606, the current value of L is increased in response to a number of features that is less than $F_{min}$, which in turn is determined in part by the geographic density of the user in step S608. Having the foregoing input values and functional dependencies, the method of the present invention then continues to adjust L values accordingly until a sufficient number of features is included within the geometry of the polygon 40.

Figure 5:
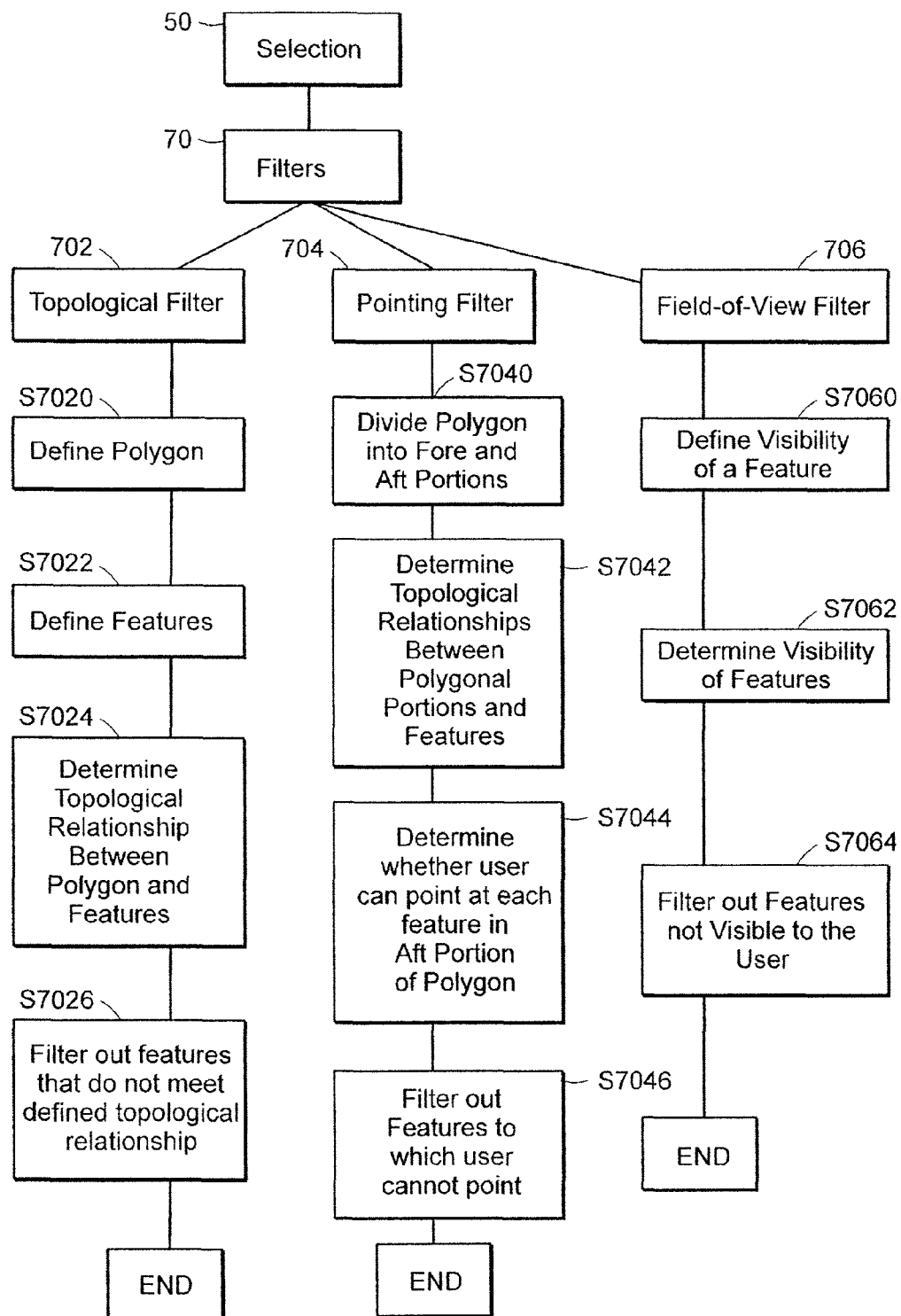
FIG. 5 is a flow chart depicting a method for filtering a set of geometric features in accordance with the present invention.

Once the initial processing has begun with respect to the dimensions of the polygon 40 as described above, the method of the present invention further provides selection means 50 that include a plurality of filters 70, shown in the flowchart of FIG. 5. The present invention preferably employs three filters, a topological filter 702, a pointing filter 704 and a field-of-view (FOV) filter 706. Each of the foregoing filters 70 can be applied according to the methodology of the present invention singly, or more preferably in combination with each other in order to ensure that the system 10 properly selects the intended geographic feature. More preferably, the filters 70 of the present invention are employed sequentially, such that each succeeding filter 70 further narrows the range of geographic features within the group initially selected by the system 10. In a preferred embodiment, the topological filter 702 beings the process, followed by the FOV filter 706, which is followed by the pointing filter 704. However, it should be understood that the foregoing filters could be executed in any order depending upon the design and configuration of the system 10 and method of the present invention.

The topological filter 702 performs a geometric selection function similar to those known in the art. In step S7020, the topological filter 702 defines the polygon 40 through the steps noted above, particularly with respect to defining the length L of the polygon 40. As previously noted, the dimensions of the polygon 40 are determined in part by the measured user position, the error in determining the user position, the user orientation, the error in determining the user orientation, and the length L, which is preferably calculated as a function of user position and geographic density. Alternatively, the value of L could retain a static, constant value in certain applications.

Once the polygon 40 is defined, the topological filter 702 defines the geographic features that coincide or otherwise overlap with the polygon 40. Thus is step S7022, the method of the present invention requires retrieving from the database 30 the list of features that are within or near the polygon 40 based upon the aforementioned criteria. It is preferable that the database 30 provides not only features that are squarely within the polygon 40, but also those that are marginally within the topological criteria.

In step S7024, the database 30 determines the topological relationship between the polygon 40 and the features determined in step S7022. There are eight primary topological relationships that exist between the polygon 40 any geographic feature, shown in the table below.

TABLE 1

| Feature geometry relative to polygon geometry | Intersection of feature and polygon | Can user stand behind feature? | Will feature be selected according to topological filter? |
|---|---|---|---|
| Disjoint | No | No | No |
| Meet | Yes, at respective boundaries | Possibly. | No. |
| Overlap | Yes | Possibly | Yes, if the user can stand behind the feature. |
| Equal | Yes | No | No. |
| Inside | Yes | Yes | Yes. |
| Contains | Yes | No | No. |
| Covers | Yes | No | No. |
| Covered By | Yes | Possibly | Yes, if the user can stand behind the feature. |

As shown in Table 1, for a plurality of topological relationships between the respective geometries of the polygon 40 and any one of the geometric features, the feature itself will be excluded by the topological filter 702. In step S7026, therefore, the topological filter 702 filters out those features that do not meet the preferred topological relationships outlined in Table 1. In the case in which the feature is within the polygon 40, then the topological filter 702 will select that feature automatically. In the remaining cases, the topological filter 702 will select those features, subject to the condition that the user is able to stand behind the feature, i.e. point the mobile device 12 at the feature.

The latter selection criteria are determined according to the pointing filter 704, which is based at least in part upon the division of the polygon 40 into its forward portion 48 and rearward portion 46, described above with reference to FIG. 2. In step S7040, the pointing filter 704 divides the polygon 40 into the aforementioned portions, such that topological relationships can be determined for the remaining features based upon their relationship to the respective portions in step S7042. In step S704 the method requires determining whether the user can point at each feature that has the necessary topological relationship with the rearward portion 46. As noted above in Table 1, if the feature is within the polygon 40, including the rearward portion 46, then it is automatically selected by the pointing filter 704. The user can point at a given feature F, even one related to the rearward portion 46, if the feature or part of the feature is in the direction of the user orientation, α.

Step S7044 therefore requires determining the necessary directional relationship between the user and the features to be selected. To express this direction measure, a simplified direction-relation matrix is preferably used. This matrix describes a cardinal direction as a binary relation involving a reference object A and a target object B, i.e., the feature of interest, and a symbol that is a non-empty subset of {N, S, E, W, NE, SE, SW, NW, 0}.

In determining if users can point at F, the reference object A is the part of the rearward portion 46 that does not intersect the feature F. The method then creates a simplified direction-relation matrix oriented to the user orientation a rather than true north. This direction-relation matrix contains the part ($UN_A$) in the direction of the user. Any spatial configuration of A and B so that $UN_A \cap F$ is non-empty means that it is possible for the user to point at F. In any other case, a second check is performed to determine if the user can point at F: an new reference object A is the part of the rearward portion 46 that intersects the feature F. The simplified direction-relation matrix is created around the new reference object A, containing the part ($US_A$) in the opposite direction of the user orientation. Any spatial configuration of A and B so that $US_A \cap F$ is non-empty means that it is possible for the user to point at F. In such a case the feature is selected according to step S7044. In step S7046, the pointing filter 704 filters out those features to which the user cannot point.

The FOV filter 706 selects geographic features based upon the visibility of those features as perceived by the user. That is, it is assumed by the present invention that the user will not be pointing the mobile device 12 intentionally at a feature that cannot be seen, and thus those features are presumptively not selected. These determinations can be made readily by the database 30, which has data regarding the user position, user orientation as well as data regarding the size, dimensions and spatial configurations of features in the user's vicinity.

In step S7060, the FOV filter 706 defines the visibility of a feature. The visibility of the feature can be determined in a number of ways, each of which is applicable to the method of the present invention. In one embodiment, the visibility of a feature is based on the relative visibility of portions of the feature, such that each feature is divided into both visible and not visible portions, with each portion of each feature then proceeding through the remainder of the FOV filter 706. Alternatively, each feature can be assigned a relative visibility value based upon metric refinement. For example, one feature may be seventy percent visible as compared to another feature that is one hundred percent visible. The proportional visibility as computed above is assigned to each feature selected by the topological filter 702 and then fed into the FOV filter.

Once the definition of visibility is resolved for the FOV filter 706, it proceeds to determine the visibility of the geographic features in step S7062 according to one of the foregoing schemes. Thus for each feature that remains after the topological filter 702, the FOV filter 706 determines whether or not that feature, or portions thereof, are visible to the user. In step S7064, the FOV filter 706 filters out those features that are not visible to the user according to predetermined constraints. For example, if the definition of visibility is related to portions of a feature, then the FOV filter 706 will only filter out those portions that are not visible to the user. If the definition of visibility is proportional or relative, then the FOV filter 706 will filter out those features that are relatively not visible, i.e. less than fifty percent visible to the user. Of course, the exact constraints for the FOV filter 706 may be varied according to the present invention, and may in fact be variable depending upon the geographic density of the area. For example, there are very few features in New York City that are one hundred percent visible at any time, thus the user would not be suited by having too stringent tolerances on the definition of visibility.

Figure 6:
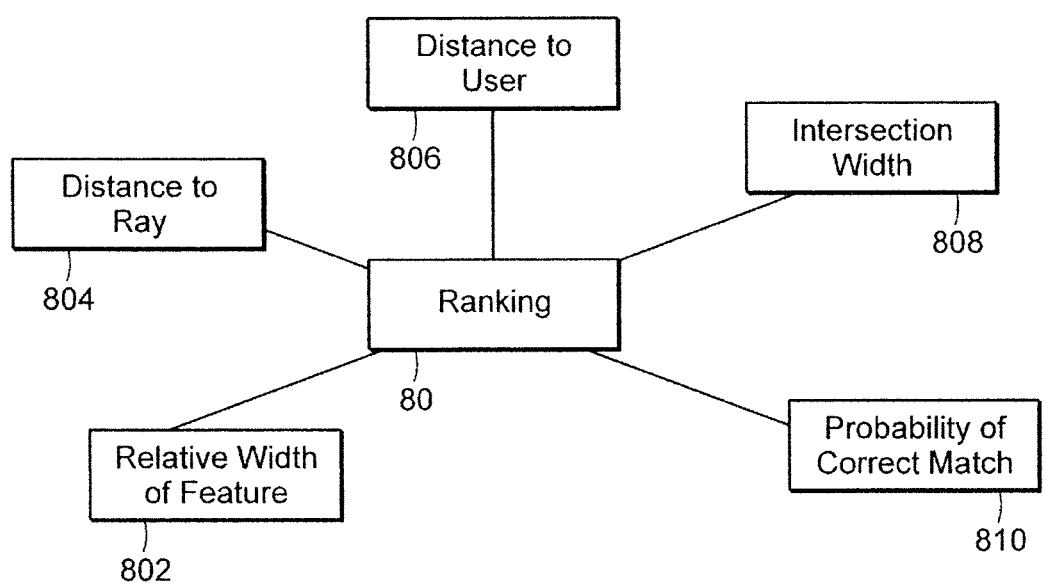
FIG. 6 is a block diagram of the ranking means of the system and method of the present invention.

FIG. 6 is a block diagram of the ranking means 80 of the system and method of the present invention. The ranking means 80 preferably include at least a means for ranking in response to the relative width 802 of the feature, a means for ranking in response to the distance between the feature and a ray 804 emanating from the device 12, a means for ranking in response to a distance to the user 806, a means for ranking in response to the intersection width 808 of the feature within the polygon 40, and a means for calculating a probability of a correct match 810 for any feature preliminary selected as described above. In preferred embodiments, discussed below, each of these ranking means is preferably embedded in software operating on the database 30. Given the relevant input data and accuracy-related corrections thereto, the ranking means generate for each feature within the polygon 40 a likelihood that said feature was in fact selected by the user. Preferably, the likelihood is expressed numerically, such as a range between zero (no likelihood of selection) and one (absolute likelihood of selection).

Figure 7:
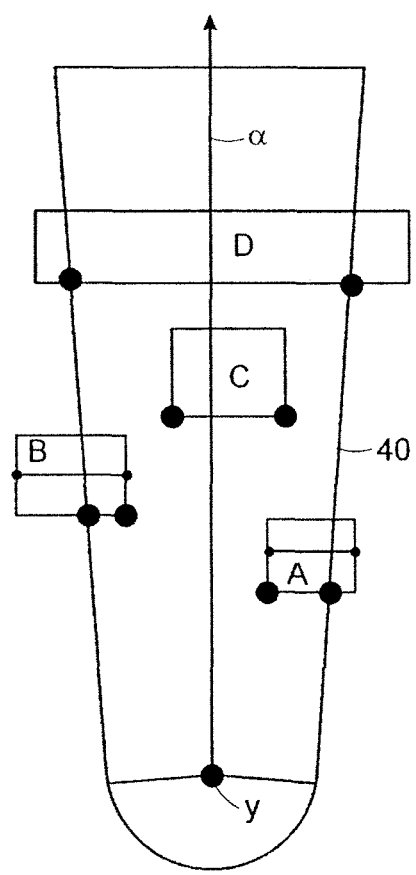
FIG. 7 is a schematic representation of a preferred ranking means according to the present invention.

Relative width ranking means 802 includes in particular the computation of the relative width of a feature based upon the position and orientation of the user as measured by the mobile device 12. As shown in FIG. 7, a user at location y and oriented in a direction a will typically have at least partial geometric features located within the polygon 40, denoted A, B, C and D. The database 30 is configured to contain or have access to data indicative of the dimensions of the respective features in a direction perpendicular or substantially perpendicular to the ray emanating from the user, i.e. the width of the features as the user would see them.

The present invention methodologically assumes that objects having a greater relative width as measured by the user position and orientation are more likely candidates for selection. Thus, as features A and B are not enclosed in the polygon 40, they are presumptively not selected by the user. Feature C and D are both intersected by the orientation ray α, and thus candidates for selection. The present invention is adapted to rank the preference of C and D based upon the width of the respective features, as defined above, relative to the distance between the user located at position y and the known location of the features. Each of the pertinent data is stored in or received by the database 30 for appropriate computation. Given the user location, the user orientation, and the established dimensions of the feature perpendicular to the user orientation ray α, the database 30 is capable of ranking a number of geographical features in the manner described above. As such, the relative width ranking means 802 is adapted to select closer features that are relatively wide in lieu of distal features that are relatively narrow, as viewed by the user.

Figure 8:
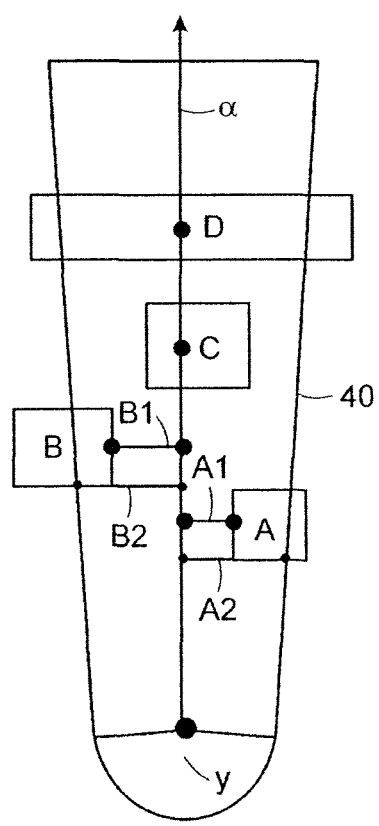
FIG. 8 is a schematic representation of another preferred ranking means according to the present invention.

Distance to ray ranking means 804 includes in particular the computation of a probability based upon the geometric values schematically represented in FIG. 8. As shown, a user disposed at location y orients the device 12 in direction α, which is represented by the ray a emanating from the location of the user. The ray α passes through or near a number of features, denoted A, B, C and D as shown in FIG. 8.

The distance to ray ranking means 804 is unsuited for ranking those features through which the ray α passes, hence both features C and D have an equal null ranking according to the present invention. Objects A and B, however, lay outside the direct line of the ray α, and are therefore subject to ranking by the distance to ray ranking means 804. Geometrically, objects A and B are related to the polygon 40 in terms of the distance from each respective feature to the ray α as well as the relative half-width of the polygon 40 at that feature. Thus, feature A is located a distance A1 from the ray α and is disposed within the polygon 40 having a half-width equal to a distance A2. Similarly, feature B is located a distance B1 from the ray a and is disposed within the polygon 40 having a half-width equal to a distance B2.

The distance to ray ranking means 804 is embedded or operable on the database 30, and is appraised of the position y of the user and the direction of the ray α. The remaining data concerning the location of the features and the geometry of the polygon 40 is either stored within the database or computable given other known parameters. Features are ranked based upon the highest ratio between the distances to the ray α and the half-width of the polygon 40 measured at the point closest to the user position y. Thus, feature A has a ratio A1/A2, and feature B has a ratio B1/B2; and whichever is a lesser numerical value is ranked higher according to the distance to ray ranking means 804. Those features that are intersected by the ray α, features C and D, receive a value of zero. For example, if the ratio A1/A2 is 4/11 and the ratio of B1/B2 is 12/14, then the database will compute the relative values for A and B as being 0.3636 and 0.8571, respectively. As such, in the example depicted in FIG. 8, the distance to ray ranking means 804 would rank feature A in front of feature B as that with which the user is more likely interested.

Figure 9:
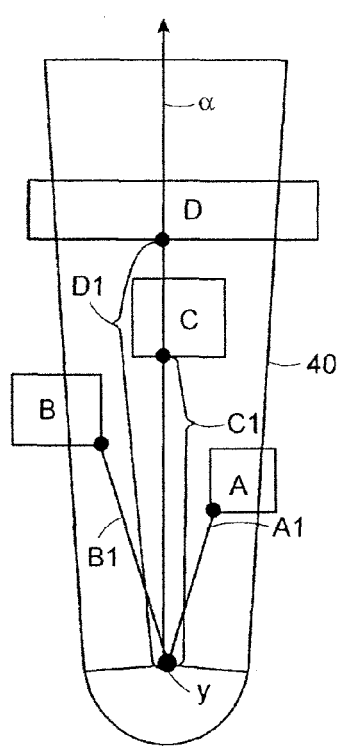
FIG. 9 is a schematic representation of another preferred ranking means according to the present invention.

FIG. 9 is a schematic representation of a distance to user ranking means 806 in accordance with the preferred invention. The distance to user ranking means 806 ranks features A, B, C and D based upon their respective distance to the user's position y along the shortest path. The relative distances are computed by the database 30 knowing the user position y and the positions of the geographic features. The relative distances are ranked through a normalization process in which each distance is divided by the greatest distance in the set.

For example, in FIG. 9 feature D is a distance D1 from the user, feature C is a distance C1 from the user, feature B is a distance B1 from the user and feature A is a distance A1 from the user. The normalized distance for each of the features is its own distance divided by the greatest distance in the set, D1. Accordingly, the feature D has a relative distance of one, and each remaining feature has a value less than one and approaching zero. The distance to user ranking means 806 then ranks the features according to the least of the numerical values. Thus, feature A has a normalized distance to user of A1/D1, which makes it the most likely candidate for selection according to the present ranking means.

Figure 10:
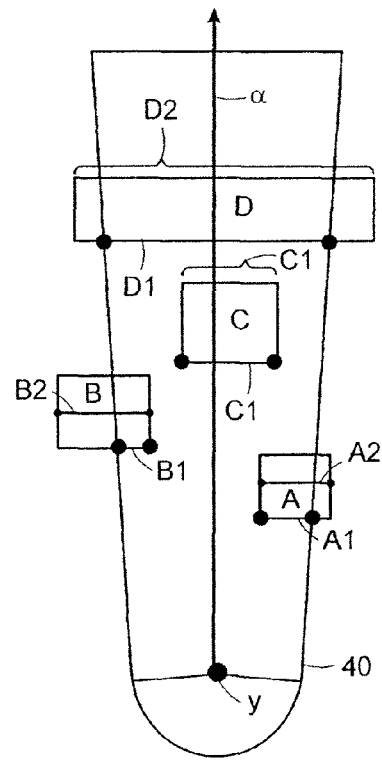
FIG. 10 is a schematic representation of another preferred ranking means according to the present invention.

FIG. 10 is a schematic representation of an intersection width ranking means 808 according to the present invention. This ranking means ranks the features, again shown as A, B, C, and D, according to the relative width of the feature within the polygon 40 as compared to the width of the feature in its entirety. Again, as noted above, the width of the features is calculated across a dimension that is substantially perpendicular to the ray α.

As shown in FIG. 10, each feature has an absolute width, A1, B1, C1 and D1, as well as a width that is intersected by the polygon 40, A2, B2, C2 and D2. For each feature, the intersection width ranking means 808 calculates a ratio based upon the normalized intersection width of each feature. For each feature, the normalized intersection width is one less the ratio W1/W2, such that a feature that is fully contained within the polygon 40 has a normalized intersection width of zero. Features that extend on both sides of the polygon 40 use a distance W2 of the with of polygon 40 so that W2 is equal to W1 and the normalized intersection width is zero. As before, the lesser the value computed by the database, the more likely it is that the user was intending to select that feature. According to the intersection width ranking means 808 as shown in FIG. 10, features C and D each have a normalized value of zero, and feature A is preferred over feature B because more of its absolute width is contained within the polygon 40. This ranking gives an indication of how well a user points at a feature.

Figure 11A:
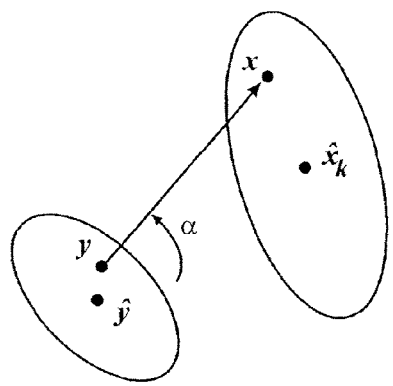
FIGS. 11a and 11b are schematic representations of another preferred ranking means according to the present invention.
Figure 11B:
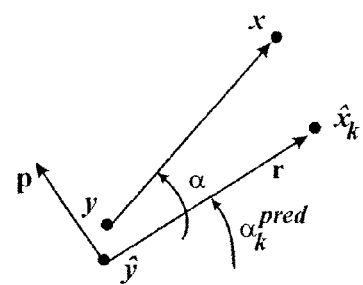

FIGS. 11a and 11b are schematic representations of another preferred ranking means according to the present invention. Means for calculating a probability of a correct match 810 are employed by the system and method of the present invention in order to further aid in the selection of a unique geographic feature by a user. The means for calculating a probability of a correct match 810 are preferably embodied in software adapted for operation on the database 30, remotely disposed from the user and the mobile device 12.

The means for calculating a probability of a correct match 810 are based primarily on mathematical computations of likelihood based upon empirical data received from the mobile device. Likelihood is defined as a conditional probability. For example, $p(\alpha|o_k)$ represents the likelihood that the user was attempting to select object $o_k$. Formally, $p(\alpha|o_k)$ is the probability (density) of observing the measured angle α given (or conditioned on) the assumption that object $o_k$ produced the measurement. What might be considered a more useful statistic is $Pr(o_k|\oplus)$. The conditional probability $Pr(o_k|\alpha)$ is the probability that $o_k$ was the intended target, given that we observed the measured angle α, i.e. given known empirical data from the mobile device 12, one can compute the most likely intended target. Baye's Rule provides the relationship between the two:

$$Pr(o_k | \alpha) = \frac{p(\alpha | o_k) Pr(o_k)}{p(\alpha)}, \quad (1)$$

where $$p(\alpha) = \sum_k p(\alpha | o_k) Pr(o_k). \quad (2)$$

In order to compute the conditional probability in Equation (1), the present invention employs not only the likelihood, but also $Pr(o_k)$: the probability that the object $o_k$ was selected, in the absence of, or prior to, making any measurements. This prior probability is usually chosen to reflect the user's assumed preference for particular objects. Equation (1) then provides the a posterior probability that the user selected object $o_k$ given knowledge of the measured pointing angle.

For example, given two objects $o_1$ and $o_2$, neither of which the user prefers; one would assign them both probability 0.5 of being chosen prior to making any measurement. After a measurement $\alpha$ of the pointing angle is made, Equation (1) provides a way of updating the probability that one or the other object was chosen, using the likelihoods $p(\alpha|o_k)$.

Given the foregoing, there are two ways to estimate which of the possible objects the user intended to select. The first is the Maximum A Posterior (MAP) estimate. For this estimate, the present invention uses the object index as the object index $k_{MAP}$ which maximizes the a posterior probability:

$$k_{MAP} = \max_k Pr(o_k | \alpha) \qquad (3)$$

We see from Equations (1) and (2) that computing these probabilities requires a prior probability, which may not be known or may be difficult to estimate.

A more preferable estimate can be obtained by maximizing the likelihoods. This is called the Maximum Likelihood (ML) estimate, $k_{ML}$:

$$k_{ML} = \max_k p(\alpha | o_k) \qquad (4)$$

The ML estimate does not require a prior probability, and depends only on the current measurement.

Determining the likelihood function usually amounts to determining the statistics of the measurement process, due to the common assumption that the measurement noise is independent of the process being measured. For example, consider the case of measuring a signal s in the presence of additive noise, n:

$$r = s + n \qquad (5)$$

where r is the measured or received value. In the case that s is modeled as a random quantity, it is easier to write out the likelihood $p(r|s)$ than the a posteriori probability $p(s|r)$. Typically the noise is zero mean Gaussian distributed with standard deviation $\sigma$:

$$p(n) = \frac{1}{\sqrt{2\pi}\,\sigma} \exp\left(-\frac{n^2}{2\sigma^2}\right) \qquad (6)$$

It turns out from the definition of conditional probability that if the noise process n is statistically independent of the signal s, one can use the relationship $r-s=n$ together with Equation (6) to write $$p(r|s) = \frac{1}{\sqrt{2\pi}\,\sigma} \exp\left(-\frac{(r-s)^2}{2\sigma^2}\right). \qquad (7)$$

Because formulas like Baye's rule often multiply probabilities, and because a probability density such as that in Equation (7) often has an exponential form, it is common to define and use the negative log-likelihood. For example, the negative log-likelihood associated with the likelihood of s in Equation (7) is:

$$l(s) = -\ln(p(r|s)) = \frac{1}{2}\ln(2\pi\sigma^2) + \frac{(r-s)^2}{2\sigma^2}. \qquad (8)$$

Therefore, in the present invention the process of maximizing the negative log-likelihood is equivalent to minimizing the likelihood; and the minimum negative log-likelihood yields the object most probably intended by the user.

Determining the likelihood of the pointing angle measurement requires that the database 30 have or receive certain data from the mobile device. Moreover, the database 30 operating according to the present invention must take into account the error in the user position, the error in the knowledge of the object position, and the error in measuring the pointing angle, all of which are assumed to be statistically independent of one another and of the prior probability of the user selecting one object over another. For purposes of the present invention, the following scalar quantities are defined below and shown graphically in FIG. 10*a*:

$x_k$: True spatial position of object $o_k$.

$\hat{x}_k$: Measured position of object $o_k$ (typically recorded in database).

$n_{x_k}$: Additive noise in measured position of object $o_k$ (typically zero mean Gaussian).

y: True spatial position of user.

$\hat{y}$: Measured position of user (typically from GPS).

$n_y$: Additive noise in measured position of user (typically zero mean Gaussian).

$\alpha$: True pointing angle from user to user-selected object.

$\alpha_k^{pred}$: Pointing angle from user to object $o_k$ as computed (predicted) from $\hat{x}_k, \hat{y}$.

$\alpha_{meas}$: Measured pointing angle (typically from magnetic sensor).

$n_\alpha$: Additive noise in measured pointing angle (typically zero mean Gaussian).

From which one can extrapolate the following relations:

$$\hat{x}_k = x_k + n_{x_k} \qquad (9)$$

$$\hat{y} = y + n_y \qquad (10)$$

$$\alpha_{meas} = \alpha + n_\alpha \qquad (11)$$

Given the foregoing, the means for calculating the probability of a correct match 810 employs the following likelihood function: $p(\alpha_{meas} - \alpha_k^{pred} | o_k)$, or the probability density of the difference between the measured angle and the angle predicted by the position sensor 20 and the database 30 for a given object $o_k$. This probability is determined from the three error source characterizations shown above and the various assumptions regarding linearity and statistical independence. For purposes of the present description, a small angle approximation is used to preserve the presentation of ideas and linearity of the functions. However, the present invention is readily adapted to calculate the probability of a correct match without such an assumption.

FIG. 10b sets forth the foregoing relations in a vector format for ease of manipulation. Examining FIG. 10b we see that:

$$\tan(\alpha - \alpha_k^{pred}) = \frac{p \cdot (x_k - y)}{\text{unit}(r) \cdot (x_k - y)}. \quad (12)$$

Using Equations (9) and (10) above, Equation (12) can be written as:

$$x_k - y = \hat{x}_k - n_{x_k} - \hat{y} + n_y = r - (n_{x_k} - n_y). \quad (13)$$

Substitution of Equation (13) into (12) yields:

$$\tan(\alpha - \alpha_k^{pred}) = \frac{p \cdot (r - n_{x_k} + n_y)}{\text{unit}(r) \cdot (r - n_{x_k} + n_y)} \quad (14)$$

or $$\tan(\alpha - \alpha_k^{pred}) = \frac{-p \cdot (n_{x_k} - n_y)}{r - \text{unit}(r) \cdot (n_{x_k} - n_y)}. \quad (15)$$

Finally using simplifying assumptions that the angle difference on the left hand side of (15) is small, and that the errors are small compared to $r = \sqrt{r \cdot r}$, the calculation looks as follows:

$$\alpha - \alpha_k^{pred} = -\frac{p}{r} \cdot (n_{x_k} - n_y). \quad (16)$$

The vector p/r can easily be computed from $\hat{x}_k$ and $\hat{y}$, the stored object position and the measured user position, shown in FIGS. 10a and 10b. One skilled in the art should note that the assumptions made to obtain Equation (16) would be violated when the user is pointing at an object closer than the typical position errors of either the object location or the user.

Equations (16) and (11) yield a measurement equation:

$$\alpha_{meas} - \alpha_k^{pred} = n_\alpha - \frac{p}{r} \cdot (n_{x_k} - n_y). \quad (17)$$

The difference between the measured and predicted angle (assuming object k produced the measurement) is a linear combination of three independent random errors.

The full development of spatially anisotropic position errors in the context of Equation (17) is known to those practiced in the art, so for the purpose of clarity the present description assumes the spatial position errors are isotropic, zero mean, and Gaussian distributed.

This discussion assumes the user position error variance to be $\sigma_y^2$, the object position error variance to be $\sigma_{x_k}^2$ and the angle measurement error variance to be $\sigma_\alpha^2$. The variance of the left hand side of (17) is then $$\sigma_{\delta\alpha}^2 = \sigma_\alpha^2 + \frac{1}{r}(\sigma_{x_k}^2 + \sigma_y^2). \quad (18)$$

The Gaussian probability density associated with (17) is $$p(\alpha_{meas} - \alpha_k^{pred} \mid o_k) = \frac{1}{\sqrt{2\pi}\,\sigma_{\delta\alpha}} \exp\left(-\frac{(\alpha_{meas} - \alpha_k^{pred})^2}{2\sigma_{\delta\alpha}^2}\right). \quad (19)$$

Equation 19 is the likelihood function set forth above. As previously noted, an alternate way to score the match between a predicted pointing angle and the measured pointing angle is by using the negative log-likelihood:

$$l(o_k) = \frac{1}{2}\log(2\pi\sigma_{\delta\alpha}^2) + \frac{(\alpha_{meas} - \alpha_k^{pred})^2}{2\sigma_{\delta\alpha}^2}. \quad (20)$$

One can easily confirm that by minimizing equation 20, the method will produce the object that the user most likely selected with the mobile device 12. This can be done simply by adapting the database 30 to select the object that has the predicted pointing angle that is closest to the measured pointing angle, thus driving the second term of equation 20 to zero. As the difference between the predicted and measured pointing angles increases, the second term of equation 20 will increase rapidly and thus confirm mathematically that any objects oriented along the measured angle are not likely candidates for selection.

In summary, the system and method of the present invention provide a user with the necessary mobile device and associated methodology for selecting a unique geographic feature. In particular, the database of the present invention is adapted for employing a plurality of filters as well as ranking means in order to sort and select a unique candidate for which information is returned to the user having the mobile device. Although described with reference to particular embodiments, it should be understood that the scope and nature of the present invention is defined exclusively by the following claims.

We claim:

1. A computer-implemented method for selecting a unique geographic feature, the method comprising the steps of:
   inputting data to a computer representing a user position;
   inputting data to the computer representing a user orientation;
   defining with the computer and a database connected thereto a polygon in response to the user position data and the user orientation data, with the polygon having a defined length that is defined as a function of a density of geographic features enclosed within the polygon;
   providing to the computer from the database connected thereto a set of geographic features coinciding with the polygon;
   filtering with the computer and the database connected thereto the set of geographic features to determine a most likely unique geographic feature, with filtering including determining whether a selected geographic feature is selectable by the polygon; and
   selecting with the computer and the database connected thereto the most likely unique geographic feature coinciding with the polygon and returning to a user at least identifying information relating to the unique geographic feature.

2. The method of claim 1 wherein the step of filtering with the computer and the database connected thereto the set of geographic features includes determining whether a selected geographic feature bears a predetermined topological relationship to the polygon in combination with the user position to determine whether a user can be located in such a position to select the selected geographic feature.

3. The method of claim 1 wherein the step of filtering with the computer and the database connected thereto the set of geographic features includes determining whether a selected geographic feature is within a field of view of the user.

4. The method of claim 1 wherein the step of filtering with the computer and the database connected thereto the set of geographic features includes determining whether a user can be located such that a pointing device is disposed between the user and a selected geographic feature.

5. The method of claim 1 wherein the step of defining with the computer and the database connected thereto the polygon includes defining the length of the polygon as a function of a predetermined number of geographical features enclosed within the polygon.

6. The method of claim 1 wherein the step of defining with the computer and the database connected thereto the-polygon includes defining the length of the polygon as a function of the quality of geographical features enclosed within the-polygon.

7. A computer-implemented method for selecting a unique geographic feature, the method comprising the steps of:
   inputting to a computer data representing a user position;
   inputting to the computer data representing a user orientation;
   defining with the computer and the database connected thereto a polygon in response to the user position data and the user orientation data;
   providing to the computer from the database connected thereto a set of geographic features coinciding with the polygon;
   filtering with the computer and the database connected thereto the set of geographic features to determine a unique geographic feature, with filtering including determining whether a selected geographic feature is selectable by the polygon;
   ranking with the computer and the database connected thereto the set of geographic features in such a manner that a highly ranked feature is a most likely selection of the user; and
   selecting with the computer and the database connected thereto a highest ranked geographic feature from among highly ranked geographic features coinciding with the polygon and returning to a user at least identifying information relating to the highest ranked geographic feature.

8. The method of claim 7 wherein the step of ranking with the computer and the database connected thereto the set of geographic features includes selecting the highly ranked geographic features as a function of distance to the user.

9. The method of claim 7 wherein the step of ranking with the computer and the database connected thereto the set of geographic features includes selecting the highly ranked geographic feature as a function of distance to an orientation ray.

10. The method of claim 7 wherein the step of ranking with the computer and the database connected thereto the set of geographic features includes selecting the highly ranked geographic feature as a function of the relative width of a geographic feature and the width of the-polygon at the intersection between the geographic feature and the-polygon.

11. The method of claim 7 wherein ranking with the computer-based system the set of geographic features includes ranking according to a probability function with probability function includes a maximum likelihood function.

12. The method of claim 7 wherein the step of ranking the set of geographic features includes selecting the highly ranked geographic feature as a function of the width of a geographic feature relative to the distance between the user and the geographic feature.

\* \* \* \* \*